(12) United States Patent
Koshika et al.

(10) Patent No.: US 9,620,772 B2
(45) Date of Patent: Apr. 11, 2017

(54) POSITIVE ELECTRODE MATERIAL CONTAINING A COMPOSITE OF SULFUR AND A POROUS CONDUCTIVE SUBSTANCE, AND GLASS OR GLASS CERAMIC PARTICLES FOR LITHIUM ION BATTERIES, AND LITHIUM ION BATTERY

(75) Inventors: Hiromichi Koshika, Sodegaura (JP); Hiroyuki Higuchi, Sodegaura (JP); Atsushi Sato, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 734 days.

(21) Appl. No.: 13/997,479

(22) PCT Filed: Dec. 21, 2011

(86) PCT No.: PCT/JP2011/007148
§ 371 (c)(1),
(2), (4) Date: Jul. 9, 2013

(87) PCT Pub. No.: WO2012/086196
PCT Pub. Date: Jun. 28, 2012

(65) Prior Publication Data
US 2013/0302684 A1    Nov. 14, 2013

(30) Foreign Application Priority Data

Dec. 24, 2010 (JP) ................. 2010-287198
Jul. 25, 2011 (JP) ................. 2011-161700

(51) Int. Cl.
*H01M 4/00* (2006.01)
*H01M 4/36* (2006.01)
(Continued)

(52) U.S. Cl.
CPC ........... *H01M 4/364* (2013.01); *H01M 4/136* (2013.01); *H01M 4/5805* (2013.01);
(Continued)

(58) Field of Classification Search
CPC .. H01M 4/5805; H01M 4/5815; H01M 4/625; H01M 10/052; H01M 4/136;
(Continued)

(56) References Cited

U.S. PATENT DOCUMENTS

2007/0287060 A1    12/2007  Naoi et al.
2011/0151335 A1*    6/2011  Deromelaere ........ H01M 4/136
                                                          429/304
(Continued)

FOREIGN PATENT DOCUMENTS

CN         101027803 A     8/2007
CN         101861674 A    10/2010
(Continued)

OTHER PUBLICATIONS

All-solid-state lithium secondary batteries using sulfide-based glass-ceramic electrolytes. Journal of Power Sources vol. 159, Issue 1, Sep. 13, 2006, pp. 193-199.*

(Continued)

*Primary Examiner* — Gary Harris
(74) *Attorney, Agent, or Firm* — Oblon, McClelland, Maier & Neustadt, L.L.P.

(57) ABSTRACT

A lithium-ion battery cathode material includes a composite of sulfur and porous carbon, and glass particles and/or glass ceramic particles that satisfy a composition represented by the following formula (1), $$Li_a M_b P_c S_d \qquad (1)$$

wherein M is B, Zn, Si, Cu, Ga, or Ge, and a to d are the compositional ratio of each element, and satisfy a:b:c:d=1 to 12:0 to 0.2:1:2 to 9.

18 Claims, 2 Drawing Sheets

(51) Int. Cl.
H01M 4/58 (2010.01)
H01M 4/62 (2006.01)
H01M 10/052 (2010.01)
H01M 4/136 (2010.01)
H01M 10/0562 (2010.01)
H01M 4/1397 (2010.01)

(52) U.S. Cl.
CPC ......... H01M 4/5815 (2013.01); H01M 4/625 (2013.01); H01M 10/052 (2013.01); H01M 10/0562 (2013.01); H01M 4/1397 (2013.01); H01M 2300/0068 (2013.01); Y02P 70/54 (2015.11); Y02T 10/7011 (2013.01)

(58) Field of Classification Search
CPC ............. H01M 10/0562; H01M 4/364; H01M 2300/0068; H01M 4/1397; Y02E 60/122; Y02T 10/7011; Y02P 70/54
USPC .............. 429/220, 231.95, 229, 231.8, 218.1
See application file for complete search history.

(56) References Cited

U.S. PATENT DOCUMENTS

2011/0259505 A1* 10/2011 Lee ....................... H01M 2/145
156/78
2012/0177997 A1 7/2012 Nakamoto et al.

FOREIGN PATENT DOCUMENTS

| JP | 2003-208897 A | 7/2003 |
| JP | 2006-85925 A | 3/2006 |
| JP | 2006-92881 A | 4/2006 |
| JP | 2006-92885 A | 4/2006 |
| JP | 2008-27581 A | 2/2008 |
| JP | 2008-103146 A | 5/2008 |
| JP | 2008-103203 A | 5/2008 |
| JP | 2009-176541 A | 8/2009 |
| JP | 2010-95390 A | 4/2010 |
| JP | 2010-232085 A | 10/2010 |
| JP | 2011-181260 A | 9/2011 |
| JP | 2011-198550 A | 10/2011 |
| TW | 200614569 A | 8/2005 |

OTHER PUBLICATIONS

Office Action issued Sep. 8, 2015 in Japanese Patent Application No. 2012-549640.
English translation of the International Preliminary Report on Patentability issued Jul. 11, 2013, in PCT/JP2011/007148, filed Dec. 21, 2011.
International Search Report and English translation of the Written Opinion of the International Searching Authority issued Apr. 3, 2012, in PCT/JP2011/007148, filed Dec. 21, 2011.
Combined Chinese Office Action and Search Report issued May 5, 2015 in Patent Application No. 201180062369.X (with English translation of categories of cited documents).
Liu Qi, et al., "Experimental Study on Porosity Measurement of Graphite Porous Materials" Lubrication Engineering, School of Electrical Engineering China University of Mining & Technology, vol. 35, No. 10, Oct. 2010, 3 pages (with English Abstract).
Liu Peisheng, "Determining Methods for Porosity of Porous Materials" The Key Laboratory of Beam Technology and Material Modification of Ministry of Education, Beijing Normal University, vol. 22, No. 6, Dec. 2005, 4 pages (with English Abstract).
Combined Taiwanese Office Action and Search Report issued Apr. 17, 2015 in Patent Application No. 100148427 (with English translation of categories of cited documents).
Extended European Search Report issued Dec. 15, 2015 in Patent Application No. 11850443.0.
Masahiro Tatsumisago, et al., "All-solid-state lithium secondary batteries using sulfide-based glass-ceramic electrolytes", Journal of Power Sources, vol. 159, No. 1, XP027937922, Sep. 13, 2006, pp. 193-199.
Tadaaki Matsumura, et al., "Nickel sulfides as a cathode for all-solid-state ceramic lithium batteries", Journal of Power Sources, vol. 174, No. 2, XP025917615, Dec. 6, 2007, pp. 632-636.
Masahiro Murayama, et al., "Material design of new lithium ionic conductor, thio-LISICON, in the $Li_2S$—$P_2S_5$ system" Solid State Ionics, vol. 170, No. 3-4, XP004515918, May 31, 2004, pp. 173-180.
Fuminori Mizuno, et al., "High lithium ion conducting glass-ceramics in the system $Li_2S$—$P_2S_5$" Solid State Ionics, vol. 177, No. 26-32, XP027895632, Oct. 31, 2006, pp. 2721-2725.

* cited by examiner

POSITIVE ELECTRODE MATERIAL CONTAINING A COMPOSITE OF SULFUR AND A POROUS CONDUCTIVE SUBSTANCE, AND GLASS OR GLASS CERAMIC PARTICLES FOR LITHIUM ION BATTERIES, AND LITHIUM ION BATTERY

CROSS REFERENCE TO RELATED APPLICATIONS

The present application is a 35 U.S.C. §371 national stage patent application of International patent application PCT/JP2011/007148, filed on Dec. 21, 2011, published as WO/2012/086196 on Jun. 28, 2012, the text of which is incorporated by reference, and claims the benefit of the filing date of Japanese application no. 2010-287198, filed on Dec. 24, 2010, and Japanese application no. 2011-161700, filed on Jul. 25, 2011, the text of both of which is also incorporated by reference.

TECHNICAL FIELD

The invention relates to a lithium-ion battery cathode material, a method for producing a composite of sulfur and porous carbon that is used for producing the cathode material, and a lithium-ion battery.

BACKGROUND ART

A lithium-ion battery that has large capacity and excellent cycle characteristics has been desired. Use of sulfur having a theoretical capacity of 1672 mAh/g for the cathode has been studied in order to achieve large capacity.

However, since sulfur has low electrical conductivity, it is necessary to provide conductivity in some way when using sulfur for the cathode.

For example, a method that mixes conductive particles (e.g., carbon) and a sulfur powder while heating the mixture at a temperature equal to or higher than the melting point of sulfur has been proposed (see Patent Document 1). In Patent Document 1, a cathode material is prepared by adding a binder resin to the resulting sulfur-carbon composite, and a nonaqueous solvent lithium-ion battery is produced using the cathode material.

However, the initial capacity of such a battery is about 1100 mAh per g of sulfur (i.e., only 66% of the theoretical capacity of sulfur is utilized).

A method that impregnates the pores of carbon with sulfur under vacuum with heating has been proposed (see Patent Document 2). In Patent Document 2, a cathode material is prepared by mixing the resulting sulfur-carbon composite with thio-LISICON ($Li_{3.25}Ge_{0.25}P_{0.75}S_4$) (i.e., sulfide-based solid electrolyte), and the performance of an all-solid-state lithium battery that utilizes thio-LISICON ($Li_{3.25}Ge_{0.25}P_{0.75}S_4$) as an electrolyte is evaluated.

However, the initial capacity (600 mAh/g) achieved when using acetylene black as carbon is smaller than that of the nonaqueous solvent lithium-ion battery disclosed in Patent Document 1. The theoretical capacity of sulfur is realized by 100% in the initial cycle when using mesoporous carbon referred to as CMK-3. However, since the irreversible capacity is as large as 46 to 61%, a sufficient capacity is not obtained in the second and subsequent cycles.

An electrochemical reaction in the cathode layer occurs only in a site where sulfur, carbon, and the electrolyte are present in intimate proximity to one another. A nonaqueous solvent lithium-ion battery is configured so that the electrolyte solution penetrates into the entire cathode layer to increase the electrochemical reaction area.

In contrast, since sulfur and carbon come in point-contact with each other when using a solid electrolyte, it is difficult to increase the electrochemical reaction area in an all-solid-state battery. The system disclosed in Patent Document 2 that uses acetylene black achieves low performance for the above reason.

The system that uses mesoporous carbon (CMK-3) has the following problem. Since CMK-3 has a large pore volume, CMK-3 can be impregnated with a large amount of sulfur, and conductivity can be efficiently provided to sulfur. It is considered that this compensates for a small reaction area to achieve a large initial capacity. However, CMK-3 has a drawback in that the irreversible capacity increases. Specifically, a sulfur active material repeatedly undergoes expansion and contraction during charging/discharging. If the solid electrolyte cannot follow the movement of the sulfur active material, contact between the solid electrolyte and sulfur or carbon is lost.

It is difficult for an all-solid-state battery to surpass a nonaqueous solvent battery in performance due to a small electrochemical reaction area and a poor capability to follow expansion and contraction of the active material. This mainly hinders practical utilization of an all-solid-state battery including a battery that uses a sulfur cathode.

RELATED-ART DOCUMENT

Patent Document

Patent Document 1: JP-A-2010-232085
Patent Document 2: JP-A-2010-95390

SUMMARY OF THE INVENTION

An object of the invention is to provide a lithium-ion battery cathode material that implements large capacity and an excellent charge/discharge efficiency, and a lithium-ion battery.

Several aspects of the invention provide the following lithium-ion battery cathode material and the like.
1. A lithium-ion battery cathode material including a composite of sulfur and a conductive substance, and at least one of glass particles and glass ceramic particles, the glass particles and the glass ceramic particles satisfying a composition represented by a formula (1),
the conductive substance being porous, $$Li_a M_b P_c S_d \tag{1}$$

wherein M is B, Zn, Si, Cu, Ga, or Ge, and a to d are a compositional ratio of each element, and satisfy a:b:c:d=1 to 12:0 to 0.2:1:2 to 9.
2. A lithium-ion battery cathode material including a composite of sulfur and porous carbon, and at least one of glass particles and glass ceramic particles, the glass particles and the glass ceramic particles satisfying a composition represented by a formula (1), $$Li_a M_b P_c S_d \tag{1}$$

wherein M is B, Zn, Si, Cu, Ga, or Ge, and a to d are a compositional ratio of each element, and satisfy a:b:c:d=1 to 12:0 to 0.2:1:2 to 9.
3. The lithium-ion battery cathode material according to 2, wherein b is 0.
4. The lithium-ion battery cathode material according to 3, wherein a ratio (a:c:d) of a, c, and d is 1 to 9:1:3 to 7.

5. The lithium-ion battery cathode material according to any one of 2 to 4, wherein the porous carbon has pores, and is characterized in that a volume of pores having a diameter of 100 nm or less is 0.5 to 4.0 cc/g.

6. The lithium-ion battery cathode material according to any one of 2 to 5, wherein the porous carbon has pores, and the pores have an average pore diameter of 0.1 to 18 nm.

7. The lithium-ion battery cathode material according to any one of 2 to 6, wherein the porous carbon has a BET specific surface area of 200 to 4500 m$^2$/g.

8. The lithium-ion battery cathode material according to any one of 2 to 6, wherein the porous carbon has a BET specific surface area of 100 to 2500 m$^2$/g.

9. The lithium-ion battery cathode material according to any one of 1 to 8, wherein the sulfur is present at least on a surface or inside pores of the conductive substance or the porous carbon.

10. A method for producing a composite of sulfur and a porous conductive substance including heating a mixture of porous conductive particles and sulfur particles at a temperature equal to or higher than a melting point of sulfur for 1 minute to 48 hours under a pressure of normal pressure to 5 MPa.

11. A composite of sulfur and a porous conductive substance produced by the method according to 10.

12. A method for producing a composite of sulfur and a porous carbon including heating a mixture of porous carbon particles and sulfur particles at a temperature equal to or higher than a melting point of sulfur for 1 minute to 48 hours under a pressure of normal pressure to 5 MPa.

13. A composite of sulfur and a porous carbon produced by the method according to 12.

14. A lithium-ion battery cathode material including the composite of sulfur and porous carbon according to 13, and at least one of glass particles and glass ceramic particles, in a dispersed state, the glass particles and the glass ceramic particles satisfying a composition represented by a formula (1), $$Li_aM_bP_cS_d \qquad (1)$$

wherein M is B, Zn, Si, Cu, Ga, or Ge, and a to d are a compositional ratio of each element, and satisfy a:b:c:d=1 to 12:0 to 0.2:1:2 to 9.

15. A lithium-ion battery cathode material including the composite of sulfur and porous carbon according to 13, and at least one of glass particles and glass ceramic particles, in an integrated state, the glass particles and the glass ceramic particles satisfying a composition represented by a formula (1), $$Li_aM_bP_cS_d \qquad (1)$$

wherein M is B, Zn, Si, Cu, Ga, or Ge, and a to d are a compositional ratio of each element, and satisfy a:b:c:d=1 to 12:0 to 0.2:1:2 to 9.

16. The lithium-ion battery cathode material according to any one of 2 to 8 and 14, wherein the composite has a porosity $\epsilon_r$ with elastic recovery of 0.005 to 0.15, the porosity $\epsilon_r$ being measured by a uniaxial compression test using a cylindrical container and a compression rod, and calculated by an expression (A), $$\epsilon_r = 1 - \{m/(\rho_p SL)\} \qquad (A)$$

where, m is the weight of the composite placed in the cylindrical container, $\rho_p$ is the true density of the composite, S is the area of the compression rod, and L is the height of the composite when compression has been released after compressing the composite placed in the cylindrical container using the compression rod until the apparent density of the composite is equal to the true density, the cylindrical container being a cylindrical container made of SKD11 and having an outer diameter of 43 mm, an inner diameter of 13 mm, a height of 40 mm, a side thickness of 15 mm, a bottom outer diameter of 13 mm, and a bottom thickness of 10 mm, and the compression rod being a rod-like body made of SKD11 and having an outer diameter of 13 mm and a length of 50 mm.

17. A cathode produced from the lithium-ion battery cathode material according to 1.

18. A cathode including the lithium-ion battery cathode material according to 1.

19. A lithium-ion battery including the cathode according to 17 or 18.

20. A lithium-ion battery that utilizes the lithium-ion battery cathode material according to any one of 2 to 8, 14, and 16.

21. A lithium-ion battery including the lithium-ion battery cathode material according to any one of 2 to 8, 14, and 16.

22. A cathode produced using the lithium-ion battery cathode material according to any one of 2 to 8, 14, and 16.

23. A cathode including the lithium-ion battery cathode material according to any one of 2 to 8, 14, and 16.

24. A composite of sulfur and a porous conductive substance having a porosity $\epsilon_r$ with elastic recovery of 0.005 to 0.15, the porosity $\epsilon_r$ being measured by a uniaxial compression test using a cylindrical container and a compression rod, and calculated by an expression (A), $$\epsilon_r = 1 - \{m/(\rho_p SL)\} \qquad (A)$$

where, m is the weight of the composite placed in the cylindrical container, $\rho_p$ is the true density of the composite, S is the area of the compression rod, and L is the height of the composite when compression has been released after compressing the composite placed in the cylindrical container using the compression rod until the apparent density of the composite is equal to the true density, the cylindrical container being a cylindrical container made of SKD11 and having an outer diameter of 43 mm, an inner diameter of 13 mm, a height of 40 mm, a side thickness of 15 mm, a bottom outer diameter of 13 mm, and a bottom thickness of 10 mm, and the compression rod being a rod-like body made of SKD11 and having an outer diameter of 13 mm and a length of 50 mm.

25. A composite of sulfur and porous carbon having a porosity $\epsilon_r$ with elastic recovery of 0.005 to 0.15, the porosity $\epsilon_r$ being measured by a uniaxial compression test using a cylindrical container and a compression rod, and calculated by an expression (A), $$\epsilon_r = 1 - \{m/(\rho_p SL)\} \qquad (A)$$

where, m is the weight of the composite placed in the cylindrical container, $\rho_p$ is the true density of the composite, S is the area of the compression rod, and L is the height of the composite when compression has been released after compressing the composite placed in the cylindrical container using the compression rod until the apparent density of the composite is equal to the true density, the cylindrical container being a cylindrical container made of SKD11 and having an outer diameter of 43 mm, an inner diameter of 13 mm, a height of 40 mm, a side thickness of 15 mm, a bottom outer diameter of 13 mm, and a bottom thickness of 10 mm, and the compression rod being a rod-like body made of SKD11 and having an outer diameter of 13 mm and a length of 50 mm.

The invention thus makes it possible to provide a lithium-ion battery that has large capacity and exhibits excellent charge/discharge efficiency.

DESCRIPTION OF EMBODIMENTS

Figure 1:
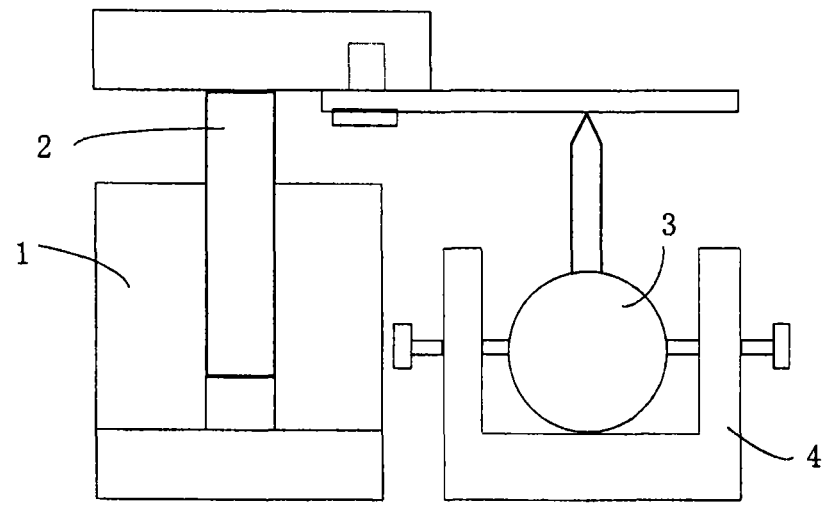
FIG. 1 is a schematic view illustrating measurement of a porosity $\epsilon_r$ with elastic recovery using a uniaxial compression system.

A lithium-ion battery cathode material according to the invention includes a composite of sulfur and a conductive substance, and at least one of glass particles and glass ceramic particles that satisfy a composition represented by the following formula (1), the conductive substance being porous,

    (1)

wherein M is B, Zn, Si, Cu, Ga, or Ge, and a to d are the compositional ratio of each element, and satisfy a:b:c:d=1 to 12:0 to 0.2:1:2 to 9.

It is preferable that the composite and the glass particles be integrated (i.e., present in an integrated state).

When the composite and the glass particles are integrated, the area of contact between sulfur of the composite and glass increases, and the battery performance of a lithium-ion battery that utilizes the lithium-ion battery cathode material can be improved.

It is preferable that the composite and the glass ceramic particles be integrated (i.e., present in an integrated state). It is also preferable that the composite, the glass particles, and the glass ceramic particles be integrated (i.e., present in an integrated state).

Note that the composite and the glass particles and/or the glass ceramic particles can be integrated by subjecting the composite and the glass particles and/or the glass ceramic particles to mechanical milling.

The shape of the porous conductive substance included in the cathode material is not particularly limited. The porous conductive substance may be a particulate conductive substance, a plate-like conductive substance, or a rod-like conductive substance.

It is preferable that the porous conductive substance be solid at 300° C. under normal pressure. It is more preferable that the porous conductive substance be solid at 350° C. under normal pressure.

It is preferable that the porous conductive substance have a melting point equal to or higher than the melting point (e.g., 112° C.) of sulfur included in the lithium-ion battery cathode material according to the invention. It is more preferable that the porous conductive substance have a melting point higher than the melting point of sulfur by 200° C. or more.

It is preferable that the porous conductive substance have an electric conductivity of $1.0 \times 10^3$ S/m or more, more preferably $1.0 \times 10^4$ S/m or more, and still more preferably $1.0 \times 10^5$ S/m or more.

Examples of the porous conductive substance include carbon, a metal powder, a metal compound, and the like. The porous conductive substance is preferably carbon.

The BET specific surface area, the pore diameter, the pore volume, the average pore diameter, and the method of producing the porous conductive substance, "the sulfur content in the composite of sulfur and porous carbon", "the porosity $\epsilon_r$ accompanied by elastic recovery of the composite", and the like are the same as those of porous carbon described later.

The porous conductive substance forms the composite together with sulfur.

The porous conductive substance has pores, for example. In this case, sulfur can be incorporated in the pores, and the area of contact with sulfur can be increased while increasing the specific surface area of sulfur.

The details of sulfur are described later.

It is preferable that the lithium-ion battery cathode material according to the invention include a composite of sulfur and porous carbon, and glass particles and/or glass ceramic particles, the glass particles and the glass ceramic particles satisfying a composition represented by the following formula (1),

    (1)

wherein M is B, Zn, Si, Cu, Ga, or Ge, and a to d are the compositional ratio of each element, and satisfy a:b:c:d=1 to 12:0 to 0.2:1:2 to 9.

It is preferable that the composite and the glass particles be integrated (i.e., present in an integrated state).

When the composite and the glass particles are integrated, the area of contact between sulfur of the composite and glass increases, and the battery performance of a lithium-ion battery that utilizes the lithium-ion battery cathode material can be improved.

It is preferable that the composite and the glass ceramic particles be integrated (i.e., present in an integrated state). It is also preferable that the composite, the glass particles, and the glass ceramic particles be integrated (i.e., present in an integrated state).

Note that the composite and the glass particles and/or the glass ceramic particles can be integrated by subjecting the composite and the glass particles and/or the glass ceramic particles to mechanical milling.

The composite of sulfur and porous carbon, the glass particles, and the glass ceramic particles are described below.

1. Composite of Sulfur and Porous Carbon

The composite of sulfur and porous carbon used in the invention is obtained by forming a composite using a mixture of porous carbon particles and sulfur particles.

Sulfur used as the raw material for forming the composite is not particularly limited. It is preferable to use sulfur having high purity. The purity of sulfur is preferably 95% or more, more preferably 96% or more, and particularly preferably 97% or more. Use of sulfur having low purity may result in irreversible capacity.

Examples of sulfur include α-sulfur (rhombic system), β-sulfur (monoclinic system), γ-sulfur (monoclinic system), amorphous sulfur, and the like. These sulfurs may be used either alone or in combination.

Examples of the porous carbon include carbon black (e.g., ketjen black, acetylene black, Denka Black, thermal black, and channel black) and carbon (e.g., graphite, carbon fibers, and activated carbon). These porous carbons may be used either alone or in combination.

It is preferable that the porous carbon have pores, and be characterized in that the volume of pores having a diameter of 100 nm or less is 0.5 to 4.0 cc/g. If the above pore volume is less than 0.5 cc/g, the sulfur content in the porous carbon may decrease, and it may be difficult to obtain a lithium-ion battery having high capacity. If the above pore volume exceeds 4.0 cc/g, sufficient electron conductivity may not be achieved even when the porous carbon forms a composite with sulfur.

The above pore volume is more preferably 0.6 to 3.95 cc/g, and particularly preferably 0.75 to 3.9 cc/g.

It is preferable that the porous carbon have pores, and the pores have an average pore diameter of 0.1 to 18 nm. If the average pore diameter is small, it may be difficult to incorporate sulfur in the pores. If the average pore diameter is too large, sulfur incorporated in the pores may not sufficiently function as an active material. The average pore diameter is more preferably 1 to 18 nm, and still more preferably 2 to 17 nm.

In the invention, the BET specific surface area, the pore diameter, the pore volume, and the average pore diameter may be measured by the following methods.

Specifically, the BET specific surface area, the pore diameter, the pore volume, and the average pore diameter may be determined using a nitrogen adsorption isotherm obtained by allowing nitrogen gas to be adsorbed on the porous carbon at liquid nitrogen temperature.

More specifically, the specific surface area can be determined by the Brenauer-Emmet-Teller (BET) method using the nitrogen adsorption isotherm. The pore diameter and the pore volume can be determined by the Barret-Joyner-Halenda (BJH) method using the nitrogen adsorption isotherm (adsorption side). The average pore diameter is calculated from the total pore volume and the BET specific surface area on the assumption that the pore structure is cylindrical.

The measurement may be performed using a specific surface area/pore distribution analyzer "Autosorb-3" (manufactured by Quantachrome), for example. A pretreatment before the measurement may include heating and evacuation at 200° C. for 3 hour, for example.

It is preferable that the BET specific surface area of the porous carbon be 200 to 4500 $m^2/g$ when the average pore diameter is small (0.1 to 15 nm), and be 100 to 2500 $m^2/g$ when the average pore diameter is large (15 to 18 nm).

It is preferable that the BET specific surface area of the porous carbon be 200 to 4500 $m^2/g$ when the average pore diameter is 1 to 15 nm.

It is preferable that the specific surface area be large in order to provide a sufficient area of contact between sulfur and the porous carbon and between the sulfur-porous carbon composite and a solid electrolyte. If the specific surface area is too large, however, the average pore diameter decreases, and it may be difficult to incorporate sulfur in the pores. When the specific surface area is small, the average pore diameter increases, and sulfur can be easily incorporated in the pores. However, since the particle size of sulfur incorporated in the pores increases, sulfur incorporated in the pores may not sufficiently function as an active material. Therefore, it is preferable that the BET specific surface area be 450 to 4500 $m^2/g$ (particularly preferably 650 to 4000 $m^2/g$) when the average pore diameter is small (0.1 to 15 nm). It is preferable that the BET specific surface area be 400 to 2000 $m^2/g$ (particularly preferably 600 to 1800 $m^2/g$) when the average pore diameter is large (15 to 18 nm).

It is preferable that the BET specific surface area be 450 to 4500 $m^2/g$ (particularly preferably 650 to 4000 $m^2/g$) when the average pore diameter is 1 to 15 nm.

It is preferable to use ketjen black or activated carbon as the porous carbon due to a large surface area, a large pore volume, and high electron conductivity.

A composite may be formed using the sulfur particles and the porous carbon particles by mixing the raw material particles using a ball mill (e.g., planetary ball mill, tumbling ball mill, or vibrating ball mill), a vertical roller mill (e.g., ring roller mill), a high-speed rotary mill (e.g., hammer mill or cage mill), an air jet mill (e.g., jet mill), or the like, or heating a mixture of the raw material particles at a temperature equal to or higher than the melting point of sulfur, for example.

It is preferable to form a composite by mixing the raw material particles using a planetary ball mill, or heating a mixture of the raw material particles at a temperature equal to or higher than the melting point of sulfur. It is particularly preferable to form a composite by heating a mixture of the raw material particles at a temperature equal to or higher than the melting point of sulfur.

A mixture of the raw material particles may be heated in an inert atmosphere, or may be heated in air. The pressure applied when heating a mixture of the raw material particles is normal pressure to 5 MPa, preferably normal pressure to 1 MPa, and more preferably normal pressure to 0.9 MPa. Note that normal pressure refers to atmospheric pressure (about 101325 Pa).

The temperature when heating a mixture of the raw material particles is not particularly limited as long as the temperature is equal to or higher than the melting point of sulfur. It is preferable to heat a mixture of the raw material particles at 112 to 440° C. The heating and holding time is 1 minute to 48 hours, preferably 10 minutes to 12 hours, and more preferably 15 minutes to 10 hours.

The sulfur content in the composite of sulfur and porous carbon is 5 to 90 wt %. The sulfur content in the composite of sulfur and porous carbon is preferably 40 to 90 wt %, and more preferably 50 to 80 wt %.

The porosity $\epsilon_r$ accompanied by elastic recovery of the composite of sulfur and porous carbon is preferably 0.005 to 0.15 of the composite of sulfur and porous carbon from the viewpoint of the balance between formability and battery performance. The porosity $\epsilon_r$ is more preferably 0.01 to 0.1, and particularly preferably 0.01 to 0.05.

In the invention, the porosity $\epsilon_r$ accompanied by elastic recovery is measured using a uniaxial compression system that utilizes a cylindrical container and a compression rod (see below), and calculated by the following expression (A).

$$\epsilon_r = 1 - \{m/(\rho_p SL)\} \quad (A)$$

where, m is the weight of the composite placed in the cylindrical container, $\rho_p$ is the true density of the composite, S is the area of the compression rod, and L is the height of the composite when compression has been stopped after compressing the composite placed in the cylindrical container using the compression rod until the apparent density of the composite is equal to the true density, the cylindrical container being a cylindrical container made of SKD11 and having an outer diameter of 43 mm, an inner diameter of 13 mm, a height of 40 mm, a side thickness of 15 mm, a bottom outer diameter of 13 mm, and a bottom thickness of 10 mm, and the compression rod being a rod-like body made of SKD11 and having an outer diameter of 13 mm and a length of 50 mm.

Figure 2:
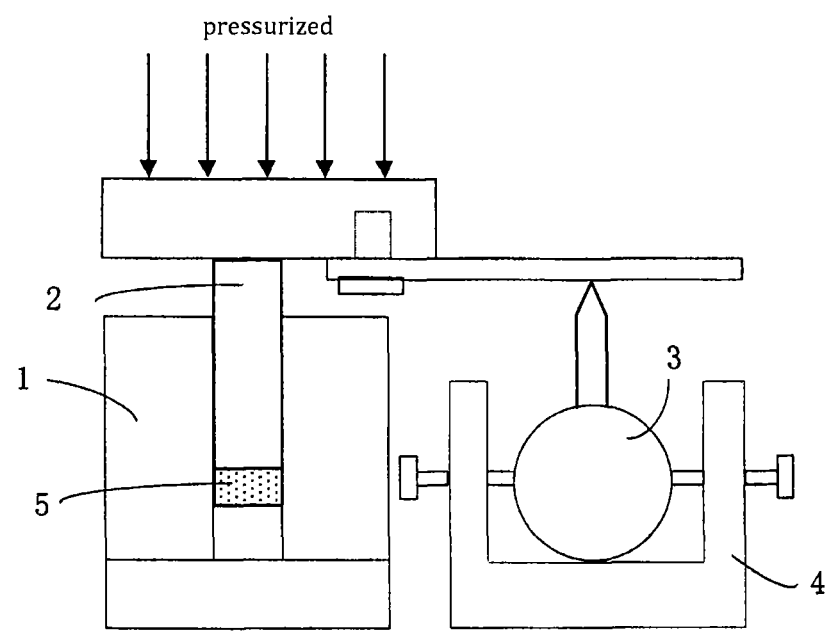
FIG. 2 is a schematic view illustrating a state in which a composite is compressed using a compression rod.
Figure 3:
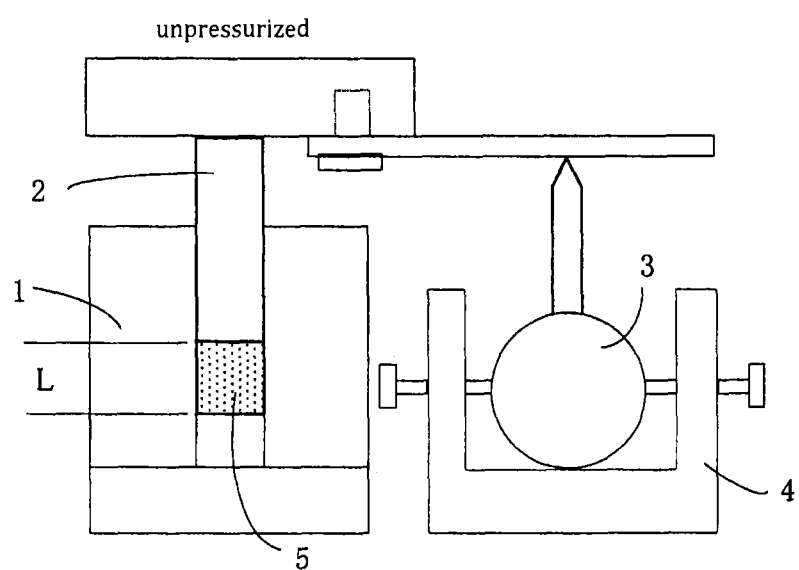
FIG. 3 is a schematic view illustrating a state in which compression using a compression rod is stopped.

FIGS. 1 to 3 are schematic views illustrating the measurement of the porosity $\epsilon_r$ with elastic recovery using the uniaxial compression system.

The uniaxial compression system includes a pressure-resistant cylindrical container 1, a compression rod 2 that compresses a composite placed in the inner space of the cylindrical container 1 to increase the density of the composite to the true density, a measuring means (micrometer) 3 that measures the height of the composite 5, and a fixture 4.

The cylindrical container 1 is made of SKD11, and has an outer diameter of 43 mm, an inner diameter of 13 mm, a height of 40 mm, a side thickness of 15 mm, a bottom outer diameter of 13 mm, and a bottom thickness of 10 mm. Note that SKD11 is a die steel manufactured by Daido Steel Co., Ltd.

The compression rod 2 is smoothly inserted into the cylindrical container 1. The compression rod 2 is made of SKD11, and has an outer diameter of 13 mm and a length of 50 mm. A pressing means (not illustrated in the drawings) that presses the compression rod 2 is provided over the compression rod 2. The uniaxial compression system includes a transmission section that transmits the displacement of the compression rod 2 to the micrometer.

The measurement of the porosity $\epsilon_r$ accompanied by elastic recovery using the uniaxial compression system is described in detail below.

The value ($I_0$) of the micrometer is read in a state in which the composite is not placed in the cylindrical container 1 (FIG. 1).

0.3 g (it may be 0.1 or 0.05 g when the bulk density is high) of the composite 5 is placed in the cylindrical container 1, and maintained in a uniform state.

The compression rod 2 is inserted into the cylindrical container 1, and the composite 5 is compressed until the apparent density of the composite 5 is equal to the true density of the composite 5 (FIG. 2). The expression "the composite 5 is compressed until the apparent density of the composite 5 is equal to the true density of the composite 5" means that the composite 5 is compressed by the compression rod 2 until the height of the composite 5 is equal to the height of the composite 5 in the cylindrical container 1 when the density of the composite 5 is the true density. Note that a case where the container 1 expands to some extent due to compression using the compression rod 2 is regarded as a measurement error.

Next, compression using the compression rod 2 is stopped (i.e., the pressure applied to the composite 5 by the compression rod 2 is set to 0) (FIG. 3). The value of the micrometer in a state in which the pressure applied to the composite 5 is set to 0 after compressing the composite 5 is referred to as $I_3$.

The value L ($I_0$-$I_3$) in the expression (A) is calculated from the measured values.

The true density $\rho_p$ of the composite is calculated by the following expression (B).

{(True density of sulfur in composite)×(wt % of sulfur in composite)+(true density of porous carbon of composite)×(wt % of porous carbon in composite)}÷100    (B)

Note that the true density of the composite may be calculated by the following expression (C).

{(True density of sulfur used when producing composite)×(weight of sulfur used when producing composite)+(true density of porous carbon used when producing composite)×(weight of porous carbon used when producing composite)}÷ (weight of sulfur used when producing composite+weight of porous carbon used when producing composite)

2. Glass Particles and Glass Ceramic Particles

The glass particles and/or the glass ceramic particles used in the invention are a lithium ion conductive inorganic solid electrolyte that satisfies a composition represented by the following formula (1).

$$Li_aM_bP_cS_d \qquad (1)$$

M in the formula (1) is B, Zn, Si, Cu, Ga, or Ge.

a to d are the compositional ratio of each element, and satisfy a:b:c:d=1 to 12:0 to 0.2:1:2 to 9.

It is preferable that b be 0. It is more preferable that the ratio (a:c:d) of a, c, and d be 1 to 9:1:3 to 7, and still more preferably 1.5 to 4:1:3.25 to 4.5.

The compositional ratio of each element can be controlled by adjusting the amount of each raw material compound used to produce the glass particles and the glass ceramic particles.

A sulfide-based solid electrolyte is preferable as the glass particles and the glass ceramic particles. The sulfide-based solid electrolyte includes at least lithium (Li), phosphorus (P), and sulfur (S). For example, the sulfide-based solid electrolyte may be produced using lithium sulfide and phosphorus pentasulfide, or lithium sulfide, elemental phosphorus, and elemental sulfur, or lithium sulfide, phosphorus pentasulfide, elemental phosphorus, and/or elemental sulfur. The sulfide-based solid electrolyte may be subjected to a flame-retardant treatment.

A sulfide-based glass ceramic solid electrolyte having a crystallinity of 50% or more is preferable as the sulfide-based solid electrolyte. If the crystallinity of the sulfide-based solid electrolyte is less than 50%, the sulfide-based solid electrolyte may exhibit poor thermal stability, and may not contribute to sufficient battery performance due to low lithium ion conductivity.

A mixture of a sulfide-based glass ceramic solid electrolyte and a sulfide-based glass solid electrolyte may also be used as long as the mixture has a crystallinity of 50% or more.

The crystallinity may be measured using an NMR spectrometer. More specifically, the crystallinity may be measured by measuring the solid-state $^{31}$P-NMR spectrum of the sulfide-based solid electrolyte, separating the resonance line observed at 70 to 120 ppm into Gaussian curves using a nonlinear least squares method, and calculating the area ratio of each curve.

It is preferable to produce the sulfide-based solid electrolyte using lithium sulfide, phosphorus pentasulfide, elemental phosphorus, and/or elemental sulfur.

Lithium sulfide is not particularly limited, and industrially available lithium sulfide may be used. Note that it is preferable to use lithium sulfide having high purity.

It is preferable to use lithium sulfide in which the total content of a lithium salt of sulfur oxide is 0.15 mass % or less, and more preferably 0.1 mass % or less, and the content of lithium N-methylaminobutyrate is 0.15 mass % or less, and more preferably 0.1 mass % or less. When the total content of a lithium salt of sulfur oxide is 0.15 mass % or less, a glassy solid electrolyte (completely amorphous) is obtained by a melt-quenching method or a mechanical milling method. If the total content of a lithium salt of sulfur oxide exceeds 0.15 mass %, a crystalline electrolyte that exhibits low ion conductivity may be obtained. The crystalline electrolyte may not show a change in properties even when subjected to a heat treatment, and a sulfide-based solid electrolyte that exhibits high ion conductivity may not be obtained.

When the content of lithium N-methylaminobutyrate is 0.15 mass % or less, it is possible to prevent a situation in which degraded lithium N-methylaminobutyrate causes a deterioration in cycle performance of the lithium-ion battery. An electrolyte that exhibits high ion conductivity can be obtained by utilizing lithium sulfide having a low impurity content.

Lithium sulfide may be produced by an arbitrary method as long as the impurity content (i.e., the content of the above impurities) can be reduced. For example, lithium sulfide produced by any of the following methods a to c may be purified to obtain lithium sulfide having a low impurity content. Note that it is preferable to use the method a or b.

a. Lithium hydroxide is reacted with hydrogen sulfide in an aprotic organic solvent at 0 to 150° C. to produce lithium hydrosulfide, and the reaction mixture is subjected to desulfurization and hydrogenation at 150 to 200° C. (see JP-A-H7-330312).

b. Lithium hydroxide is reacted with hydrogen sulfide in an aprotic organic solvent at 150 to 200° C. to produce lithium sulfide directly (see JP-A-H7-330312).

c. Lithium hydroxide is reacted with a gaseous sulfur source at 130 to 445° C. (see JP-A-H9-283156).

Lithium sulfide thus obtained may be purified by an arbitrary method. Examples of a preferable purification method include the purification method disclosed in WO2005/40039 and the like. Specifically, lithium sulfide obtained as described above is washed with an organic solvent at 100° C. or more.

The organic solvent used for washing is preferably an aprotic polar solvent. It is more preferable that the aprotic organic solvent used to produce lithium sulfide be identical with the aprotic polar organic solvent used for washing.

Examples of the aprotic polar organic solvent that may preferably be used for washing include aprotic polar organic compounds such as amide compounds, lactam compounds, urea compounds, organic sulfur compounds, and cyclic organic phosphorous compounds. These compounds may be used either alone or in combination. In particular, N-methyl-2-pyrrolidone (NMP) is selected as a favorable solvent.

The amount of the organic solvent used for washing and the number of washings are not particularly limited. It is preferable the number of washings be 2 or more. It is preferable to wash lithium sulfide in an inert gas atmosphere (e.g., nitrogen or argon).

Lithium sulfide used in the invention can be obtained by drying the washed lithium sulfide for 5 minutes or more (preferably about 2 to 3 hours or more) under normal pressure or reduced pressure in an inert gas (e.g., nitrogen) stream at a temperature equal to or higher than the boiling point of the organic solvent used for washing.

An arbitrary product that is industrially produced and sold may be used as phosphorus pentasulfide ($P_2S_5$). Note that elemental phosphorus (P) and elemental sulfur (S) may be used in the corresponding molar ratio instead of $P_2S_5$. An arbitrary product that is industrially produced and sold may be used as elemental phosphorus (P) and elemental sulfur (S).

The molar ratio of lithium sulfide to phosphorus pentasulfide (or elemental phosphorus and elemental sulfur) is normally 50:50 to 80:20, and preferably 60:40 to 75:25.

The molar ratio ($Li_2S:P_2S_5$) of lithium sulfide to phosphorus pentasulfide is particularly preferably about 68:32 to 74:26.

The sulfide-based glass solid electrolyte may be produced by a melt-quenching method or a mechanical milling method (MM method).

When producing the sulfide-based glass solid electrolyte by the melt-quenching method, specific amounts of $P_2S_5$ and $Li_2S$ are mixed using a mortar to prepare pellets. The pellets are put in a carbon-coated quartz tube, and the quartz tube is sealed under vacuum. The mixture is reacted at a given reaction temperature, and quenched in an ice bath to obtain a sulfide-based glass solid electrolyte.

In this case, the reaction temperature is preferably 400 to 1000° C., and more preferably 800 to 900° C.

The reaction time is preferably 0.1 to 12 hours, and more preferably 1 to 12 hours.

The reaction product quenching temperature is normally 10° C. or less, and preferably 0° C. or less. The cooling rate is normally about 1 to 10,000 K/sec, and preferably 10 to 10,000 K/sec.

When producing the sulfide-based glass solid electrolyte by the MM method, specific amounts of $P_2S_5$ and $Li_2S$ are mixed using a mortar, and reacted for a given time using a ball mill or the like to obtain a sulfide-based glass solid electrolyte.

The raw materials may be reacted at room temperature when using the MM method. The MM method has an advantage in that thermal decomposition of the raw materials does not occur, and a glass solid electrolyte having the original composition can be obtained since the glass solid electrolyte can be produced at room temperature.

The MM method has an additional advantage in that a fine glass solid electrolyte powder can be obtained while producing the glass solid electrolyte.

The MM method may be implemented using a rotary ball mill, a tumbling ball mill, a vibrating ball mill, a planetary ball mill, or the like.

For example, when using a planetary ball mill, the rotational speed may be set to several ten to several hundred revolutions per minute, and the treatment time may be set to 0.5 to 100 hours.

Specific examples of the method for producing the sulfide-based glass solid electrolyte using the melt-quenching method or the MM method have been described above. Note that the production conditions (e.g., temperature and treatment time) may be appropriately adjusted depending on the production equipment and the like.

The resulting sulfide-based glass solid electrolyte is subjected to a heat treatment at a given temperature to produce a sulfide-based crystallized glass (glass ceramic) solid electrolyte.

The heat treatment temperature for producing the sulfide-based crystallized glass solid electrolyte is preferably 180 to 330° C., more preferably 200 to 320° C., and particularly preferably 210 to 310° C. If the heat treatment temperature is less than 180° C., crystallized glass having high crystallinity may not be obtained. If the heat treatment temperature exceeds 330° C., crystallized glass having low crystallinity may be obtained.

The heat treatment time is preferably 3 to 240 hours, and particularly preferably 4 to 230 hours, when the heat treatment temperature is 180 to 210° C. The heat treatment time is preferably 0.1 to 240 hours, more preferably 0.2 to 235 hours, and particularly preferably 0.3 to 230 hours, when the heat treatment temperature is more than 210° C. and 330° C. or less.

If the heat treatment time is less than 0.1 hours, crystallized glass having high crystallinity may not be obtained. If the heat treatment time exceeds 240 hours, crystallized glass having low crystallinity may be obtained.

It is preferable that the sulfide-based crystallized glass solid electrolyte have diffraction peaks at $2\theta=17.8\pm0.3$ deg, 18.2±0.3 deg, 19.8±0.3 deg, 21.8±0.3 deg, 23.8±0.3 deg, 25.9±0.3 deg, 29.5±0.3 deg, and 30.0±0.3 deg when subjected to X-ray diffraction analysis (CuKα: λ=1.5418 Å).

The solid electrolyte having such a crystal structure exhibits very high lithium ion conductivity.

The lithium-ion battery cathode material according to the invention includes the composite of sulfur and porous carbon, and the glass particles and/or the glass ceramic particles.

The content of the composite of sulfur and porous carbon in the lithium-ion battery cathode material according to the invention is 30 to 99 mass %. The content of the composite of sulfur and porous carbon is preferably 35 to 90 mass %, and particularly preferably 50 to 80 mass %.

The content of the glass particles and/or the glass ceramic particles in the lithium-ion battery cathode material according to the invention is 1 to 70 mass %. The content of the glass particles and/or the glass ceramic particles is preferably 10 to 65 mass %, and particularly preferably 20 to 50 mass %.

The lithium-ion battery cathode material according to the invention may include a binder resin, a conductive substance (conductive additive), a cathode active material other than the composite according to the invention, and the like in addition to the composite of sulfur and porous carbon and the glass particles and/or glass ceramic particles.

The lithium-ion battery cathode material according to the invention is preferably prepared by mixing and dispersing the composite of sulfur and porous carbon, the glass particles and/or the glass ceramic particles, and an optional additive.

The components may be mixed by an arbitrary method. For example, the components may be mixed using a kneader, a ball mill (e.g., planetary ball mill, tumbling ball mill, or vibrating ball mill), a vertical roller mill (e.g., ring roller mill), a high-speed rotary mill (e.g., hammer mill or cage mill), or an air jet mill (e.g., jet mill), or may be mixed by wet blending using a Filmix or the like, or may be mixed by dry blending via mechanofusion or the like.

A lithium-ion battery according to the invention utilizes the lithium-ion battery cathode material according to the invention. The lithium-ion battery according to the invention may have a known configuration (e.g., cathode, electrolyte layer, and anode).

The electrolyte layer preferably includes an electrolyte that satisfies the composition represented by the formula (1). The above description applies to the electrolyte that satisfies the composition represented by the formula (1).

A composite according to the invention is a composite of sulfur and a porous conductive substance or a composite of sulfur and porous carbon, and has a porosity $\epsilon_r$ with elastic recovery measured by a uniaxial compression test of 0.005 to 0.15. The composite according to the invention is used as a raw material for producing the lithium-ion battery cathode material according to the invention, or a component of the lithium-ion battery cathode material according to the invention.

The composite according to the invention is the same as the composite described above in connection with the lithium-ion battery cathode material according to the invention.

EXAMPLES

Production Example 1

Production of Glass Ceramic Particles (Sulfide-Based Solid Electrolyte)

(1) Production of Lithium Sulfide ($Li_2S$)

Lithium sulfide was produced by the first method (two-step method) disclosed in JP-A-H7-330312. Specifically, a 10-liter autoclave equipped with a stirring blade was charged with 3326.4 g (33.6 mol) of N-methyl-2-pyrrolidone (NMP) and 287.4 g (12 mol) of lithium hydroxide, and the mixture was heated to 130° C. with stirring (300 rpm). After heating the mixture, hydrogen sulfide was bubbled into the mixture for 2 hours at a supply rate of 3 l/min.

Next, the temperature of the reaction mixture was increased in a nitrogen stream (200 cc/min) to desulfurize and hydrogenate part of the reacted hydrogen sulfide. Water that was produced by the reaction between hydrogen sulfide and lithium hydroxide as a by-product started to evaporate as the temperature of the reaction mixture increased. The evaporated water was condensed using a condenser, and removed from the system. The temperature of the reaction mixture increased when water was removed from the system. The temperature increase operation was stopped when the temperature reached 180° C., and the system was maintained at a constant temperature. After completion of desulfurization and hydrogenation (about 80 minutes), the reaction was terminated to obtain lithium sulfide.

(2) Purification of Lithium Sulfide

After decanting NMP in 500 mL of the slurry reaction mixture (NMP-lithium sulfide slurry) obtained in (1), 100 mL of dehydrated NMP was added to the slurry reaction mixture, and the mixture was stirred at 105° C. for about 1 hour. Next, NMP was decanted at 105° C. After the addition of 100 mL of NMP, the mixture was stirred at 105° C. for about 1 hour, and NMP was decanted at 105° C. The same operation was repeated four times in total. After completion of decantation, lithium sulfide was dried at 230° C. (i.e., a temperature equal to or higher than the boiling point of NMP) for 3 hours under normal pressure in a nitrogen stream.

The impurity content in the resulting lithium sulfide was determined.

The content of lithium sulfite ($Li_2SO_3$), lithium sulfate ($Li_2SO_4$), lithium thiosulfate ($Li_2S_2O_3$), and lithium N-methylaminobutyrate (LMAB) was determined by ion chromatography. It was found that the total sulfur oxide content was 0.13 mass %, and the LMAB content was 0.07 mass %.

(3) Production of Sulfide-Based Solid Electrolyte $Li_2S$ produced as described above and $P_2S_5$ (manufactured by Aldrich) were used as starting materials. About 1 g of a mixture prepared by mixing $Li_2S$ and $P_2S_5$ in a molar ratio of 70:30 and ten alumina balls having a diameter of 10 mm were put in an alumina container (45 ml). The contents of the container were subjected to a mechanical milling treatment (in a nitrogen atmosphere) at room temperature (25° C.) and a rotational speed of 370 rpm for 20 hours using a planetary ball mill ("P-7" manufactured by Fritsch) to obtain a sulfide-based glass solid electrolyte as a whitish yellow powder. The glass transition temperature of the sulfide-based glass solid electrolyte was measured by differential scanning calorimetry (DSC), and found to be 220° C.

The sulfide-based glass solid electrolyte had a composition ($Li_aM_bP_cS_d$) wherein a=14, b=0, c=6, and d=22.

The sulfide-based glass was heated at 300° C. for 2 hours in a nitrogen atmosphere. The resulting sulfide glass ceramic was subjected to X-ray diffraction analysis. Peaks were observed at 2θ=17.8, 18.2, 19.8, 21.8, 23.8, 25.9, 29.5, and 30.0 deg.

Example 1

(1) Preparation of Composite of Sulfur and Porous Carbon 0.400 g of sulfur (manufactured by Aldrich, purity: 99.998%) and 0.400 g of porous carbon ("Ketjen Black (KB) EC600JD" manufactured by Lion Corporation) were mixed using a mortar, and the mixture was placed in an airtight stainless steel container, and heated in an electric furnace. The mixture was heated at a rate of 10° C./min from room temperature to 150° C., held at 150° C. for 6 hours, heated to 300° C. at a rate of 10° C./min, held for 2.75 hours, and then allowed to cool to obtain a composite.

The porosity $\epsilon_r$ accompanied by elastic recovery of the composite was measured using the system illustrated in FIG. 1, and found to be 0.013. Note that the weight m of the composite was 0.1 g, the true density $\rho_p$ was 2.01 g/cm³, and the height L of the composite after stopping compression using the compression rod was 0.38 mm.

The volume of pores having a pore diameter of 100 nm or less, the average pore diameter, and the BET specific surface area of the porous carbon used in Example 1 and the following examples and comparative examples are shown in Table 1.

TABLE 1

|  | Pore volume* (cc/g) | Average pore diameter (nm) | BET specific surface area (m²/g) |
| --- | --- | --- | --- |
| Ketjen black | 2.7 | 12.7 | 1365 |
| Acetylene black | 0.2 | 19.2 | 76 |
| CMK-3 | 1.7 | 4.3 | 1572 |
| MSC30 | 1.6 | 2.3 | 2841 |

*Volume of pores having a pore diameter of 100 nm or less (2) Preparation of Cathode Material 0.5 g of the composite prepared in (1) and 0.5 g of the sulfide-based solid electrolyte powder produced in Production Example 1 were put in a mill pot, and subjected to a mechanical milling treatment (in an argon atmosphere) at room temperature (25° C.) and a rotational speed of 370 rpm for 5 hours using a planetary ball mill ("P-7" manufactured by Fritsch) to obtain a cathode material.

(3) Production of Lithium-Ion Battery 50 mg of the sulfide-based solid electrolyte prepared in Production Example 1 was put in a plastic cylinder (diameter: 10 mm), and compression-formed. Next, 7.2 mg of the cathode material was put in the cylinder, and compression-formed. An indium foil (thickness: 0.3 mm, diameter: 9.5 mm) and a lithium foil (thickness: 0.2 mm, diameter: 9.5 mm) were placed on the side opposite to the cathode material to form a three-layer structure consisting of a cathode, a solid electrolyte layer, and an anode. A lithium-ion battery was thus produced.

Example 2

A cathode material and a lithium-ion battery were obtained in the same manner as in Example 1, except that the composite was prepared using 0.500 g of sulfur and 0.214 g of carbon.

Example 3

A cathode material and a lithium-ion battery were obtained in the same manner as in Example 1, except that the composite of sulfur and porous carbon was prepared by subjecting 0.500 g of sulfur and 0.214 g of carbon to the mechanical milling treatment (in an argon atmosphere) at room temperature (25° C.) and a rotational speed of 370 rpm for 5 hours using a planetary ball mill ("P-7" manufactured by Fritsch).

Example 4

A cathode material and a lithium-ion battery were obtained in the same manner as in Example 1, except that acetylene black was used as porous carbon, and the composite of sulfur and carbon was prepared using 0.500 g of sulfur and 0.214 g of carbon.

Example 5

A cathode material and a lithium-ion battery were obtained in the same manner as in Example 1, except that activated carbon ("MSC30" manufactured by Kansai Coke and Chemicals Co., Ltd.) was used as porous carbon, and the composite of sulfur and carbon was prepared using 0.500 g of sulfur and 0.214 g of carbon.

Comparative Example 1

A cathode material and a lithium-ion battery were obtained in the same manner as in Example 1, except that thio-LISICON ($Li_{3.25}Ge_{0.25}P_{0.75}S_4$) was used as the solid electrolyte used for the cathode material and the solid electrolyte used for the solid electrolyte layer.

Comparative Example 2

A cathode material and a lithium-ion battery were obtained in the same manner as in Example 1, except that the composite of sulfur and carbon was prepared using 0.500 g of sulfur and 0.214 g of carbon, and thio-LISICON ($Li_{3.25}Ge_{0.25}P_{0.75}S_4$) was used as the solid electrolyte used for the cathode material and the solid electrolyte used for the solid electrolyte layer.

Comparative Example 3

A cathode material and a lithium-ion battery were obtained in the same manner as in Example 1, except that the composite of sulfur and carbon was prepared by subjecting 0.500 g of sulfur and 0.214 g of carbon to the mechanical milling treatment (in an argon atmosphere) at room temperature (25° C.) and a rotational speed of 370 rpm for 5 hours using a planetary ball mill ("P-7" manufactured by Fritsch), and thio-LISICON ($Li_{3.25}Ge_{0.25}P_{0.75}S_4$) was used as the solid electrolyte used for the cathode material and the solid electrolyte used for the solid electrolyte layer.

Comparative Example 4

A cathode material and a lithium-ion battery were obtained in the same manner as in Example 1, except that acetylene black (AB) was used as carbon, the composite of sulfur and carbon was prepared using 0.500 g of sulfur and 0.214 g of carbon, and thio-LISICON ($Li_{3.25}Ge_{0.25}P_{0.75}S_4$) was used as the solid electrolyte used for the cathode material and the solid electrolyte used for the solid electrolyte layer.

Comparative Example 5

A cathode material and a lithium-ion battery were obtained in the same manner as in Example 1, except that CMK-3 was used as carbon, the composite of sulfur and carbon was prepared using 0.500 g of sulfur and 0.214 g of carbon, and thio-LISICON ($Li_{3.25}Ge_{0.25}P_{0.75}S_4$) was used as the solid electrolyte used for the cathode material and the solid electrolyte used for the solid electrolyte layer.

The lithium-ion battery thus obtained was subjected to a constant-current charge/discharge test (charge/discharge current density: 0.500 mA/cm$^2$, charge/discharge potential range: 0.5 to 2.2 V, charge/discharge temperature: 25° C.). Note that this charge/discharge operation was the first charge/discharge operation of the lithium-ion battery after production of the battery. The results are shown in Table 2.

The constant-current charge/discharge test was performed again at a charge/discharge current density of 10 mA/cm$^2$. Note that this charge/discharge operation was the second charge/discharge operation of the lithium-ion battery after production of the battery. The results are shown in Table 3.

TABLE 2

| | Composite of sulfur and porous carbon | | | Solid electrolyte | | First discharge capacity | First charge capacity | Efficiency |
|---|---|---|---|---|---|---|---|---|
| | Sulfur (wt %) | Carbon (Type) (wt %) | Composite-forming method | Type | (wt %) | (mAh/g-S) | (mAh/g-S) | (%) |
| Example 1 | 25 | 25 (KB) | Heating | A | 50 | 1907 | 1859 | 97 |
| Example 2 | 35 | 15 (KB) | Heating | A | 50 | 1800 | 1761 | 98 |
| Example 3 | 35 | 15 (KB) | MM | A | 50 | 1622 | 1498 | 92 |
| Example 4 | 35 | 15 (AB) | Heating | A | 50 | 1520 | 1477 | 97 |
| Example 5 | 35 | 15 (MSC30) | Heating | A | 50 | 1790 | 1773 | 99 |
| Comparative Example 1 | 25 | 25 (KB) | Heating | B | 50 | 1210 | 571 | 47 |
| Comparative Example 2 | 35 | 15 (KB) | Heating | B | 50 | 950 | 403 | 42 |
| Comparative Example 3 | 35 | 15 (KB) | MM | B | 50 | 903 | 329 | 36 |
| Comparative Example 4 | 35 | 15 (AB) | Heating | B | 50 | 452 | 309 | 68 |
| Comparative Example 5 | 35 | 15 (CMK-3) | Heating | B | 50 | 1010 | 475 | 47 |

KB: ketjen black,
AB: acetylene black,
CMK-3: mesoporous carbon,
MSC30: activated carbon
Solid electrolyte A: $Li_2S$—$P_2S_5$-based solid electrolyte,
solid electrolyte B: $Li_{3.25}Ge_{0.25}P_{0.75}S_4$-based solid electrolyte

TABLE 3

| | Composite of sulfur and porous carbon | | | Solid electrolyte | | Discharge capacity at 10 mA/cm$^2$ |
|---|---|---|---|---|---|---|
| | Sulfur (wt %) | Carbon (wt %) | Composite-forming method | Type | (wt %) | (mAh/g-S) |
| Example 1 | 25 | 25 (KB) | Heating | A | 50 | 850 |
| Example 2 | 35 | 15 (KB) | Heating | A | 50 | 841 |
| Example 3 | 35 | 15 (KB) | MM | A | 50 | 298 |
| Example 4 | 35 | 15 (AB) | Heating | A | 50 | 202 |
| Example 5 | 35 | 15 (MSC30) | Heating | A | 50 | 839 |
| Comparative Example 1 | 25 | 25 (KB) | Heating | B | 50 | 55 |
| Comparative Example 2 | 35 | 15 (KB) | Heating | B | 50 | 59 |
| Comparative Example 3 | 35 | 15 (KB) | MM | B | 50 | 40 |

TABLE 3-continued

| | Composite of sulfur and porous carbon | | | | | Discharge capacity at 10 mA/cm² |
|---|---|---|---|---|---|---|
| | Sulfur | Carbon | Composite-forming | Solid electrolyte | | |
| | (wt %) | (wt %) | method | Type | (wt %) | (mAh/g-S) |
| Comparative Example 4 | 35 | 15 (AB) | Heating | B | 50 | Not discharged |
| Comparative Example 5 | 35 | 15 (CMK-3) | Heating | B | 50 | 33 |

KB: ketjen black,
AB: acetylene black,
CMK-3: mesoporous carbon,
MSC30: activated carbon
Solid electrolyte A: $Li_2S$—$P_2S_5$-based solid electrolyte,
solid electrolyte B: $Li_{3.25}Ge_{0.25}P_{0.75}S_4$-based solid electrolyte In the examples according to the invention, the $Li_2S$—$P_2S_5$-based sulfide was used as the solid electrolyte glass ceramic particles. The ion conductivity ($2\times10^{-3}$ S/cm) of the electrolyte is almost equal to that of thio-LISICON ($Li_{3.25}Ge_{0.25}P_{0.75}S_4$). The cathode material was prepared by mixing the composite of sulfur and porous carbon with the $Li_2S$—$P_2S_5$-based sulfide, and an all-solid-state battery was produced using the cathode material.

As a result, a capacity as large as 1672 mAh/g (theoretical capacity) was achieved, and the irreversible capacity was almost 0%. These results completely differ from those obtained when using thio-LISICON ($Li_{3.25}Ge_{0.25}P_{0.75}S_4$). The capacity of the battery was larger than that of the nonaqueous solvent battery disclosed in Patent Document 1. It is considered that the performance of the all-solid-state battery according to the invention surpassed the performance of a nonaqueous solvent battery for the first time ever.

INDUSTRIAL APPLICABILITY

The lithium-ion battery cathode material according to the invention may suitably be used for producing the cathode of a lithium-ion battery. The lithium-ion battery according to the invention may be used as a battery for a portable information terminal, a portable electronic instrument, a domestic small power storage device, a motorcycle, an electric vehicle, a hybrid electric vehicle, and the like.

Although only some exemplary embodiments and/or examples of the invention have been described in detail above, those skilled in the art will readily appreciate that many modifications are possible in the exemplary embodiments and/or examples without materially departing from the novel teachings and advantages of the invention. Accordingly, all such modifications are intended to be included within the scope of the invention.

The documents described in the specification are incorporated herein by reference in their entirety.

The invention claimed is:

1. A lithium-ion battery cathode material comprising a composite of sulfur and a porous conductive substance, and at least one type of particles selected from the group consisting of glass particles and glass ceramic particles, wherein the glass particles and the glass ceramic particles have a composition represented by a formula (1), and the sulfur is present on a surface of the inside the pores of the porous conductive substance, $$Li_aM_bP_cS_d \qquad (1)$$

wherein M is B, Zn, Si, Cu, Ga, or Ge, and a to d are a compositional ratio of each element, and satisfy a:b:c:d=1 to 12:0 to 0.2:1:2 to 9.

2. A lithium-ion battery cathode material comprising a composite of sulfur and porous carbon, and at least one type of particles selected from the group consisting of glass particles and glass ceramic particles, wherein the glass particles and the glass ceramic particles have a composition represented by a formula (1), and the sulfur is present on a surface of the inside the pores of the porous conductive substance, $$Li_aM_bP_cS_d \qquad (1)$$

wherein M is B, Zn, Si, Cu, Ga, or Ge, and a to d are a compositional ratio of each element, and satisfy a:b:c:d=1 to 12:0 to 0.2:1:2 to 9.

3. The lithium-ion battery cathode material according to claim 2, wherein b is 0.

4. The lithium-ion battery cathode material according to claim 3, wherein a ratio a:c:d is 1 to 9:1:3 to 7.

5. The lithium-ion battery cathode material according to claim 2, wherein the porous carbon has pores, wherein a volume of pores having a diameter of 100 nm or less is 0.5 to 4.0 cc/g.

6. The lithium-ion battery cathode material according to claim 2, wherein the porous carbon has pores, and the pores have an average pore diameter of 0.1 to 18 nm.

7. The lithium-ion battery cathode material according to claim 2, wherein the porous carbon has a BET specific surface area of 200 to 4500 m²/g.

8. The lithium-ion battery cathode material according to claim 2, wherein the porous carbon has a BET specific surface area of 100 to 2500 m²/g.

9. The lithium-ion battery cathode material according to claim 1, comprising the composite of sulfur and porous carbon and the at least one type of particles selected from the group consisting of glass particles and glass ceramic particles, in a dispersed state.

10. The lithium-ion battery cathode material according to claim 1, comprising the composite of sulfur and porous carbon, and the at least one type of particles selected from the group consisting of glass particles and glass ceramic particles, in an integrated state.

11. The lithium-ion battery cathode material according to claim 2, wherein the composite has a porosity $\epsilon_r$ with elastic recovery of 0.005 to 0.15, the porosity $\epsilon_r$ being measured by a uniaxial compression test using a cylindrical container and a compression rod, and calculated by an expression (A), $$\epsilon_r = 1 - \{m/(\rho_p SL)\} \qquad (A)$$

where, m is the weight of the composite placed in the cylindrical container, $\rho_p$ is the true density of the composite, S is the area of the compression rod, and L is the height of the composite when compression has been released after compressing the composite placed in the cylindrical container using the compression rod until the apparent density of the composite is equal to the true density, the cylindrical container being a cylindrical container made of SKD11 and having an outer diameter of 43 mm, an inner diameter of 13 mm, a height of 40 mm, a side thickness of 15 mm, a bottom outer diameter of 13 mm, and a bottom thickness of 10 mm, and the compression rod being a rod-like body made of SKD11 and having an outer diameter of 13 mm and a length of 50 mm.

12. A cathode produced from the lithium-ion battery cathode material according to claim 1.

13. A cathode comprising the lithium-ion battery cathode material according to claim 1.

14. A lithium-ion battery comprising the cathode according to claim 12.

15. A lithium-ion battery that utilizes the lithium-ion battery cathode material according to claim 2.

16. A lithium-ion battery comprising the lithium-ion battery cathode material according to claim 2.

17. A cathode produced using the lithium-ion battery cathode material according to claim 2.

18. A cathode comprising the lithium-ion battery cathode material according to claim 2.

* * * * *

UNITED STATES PATENT AND TRADEMARK OFFICE
CERTIFICATE OF CORRECTION

PATENT NO. : 9,620,772 B2
APPLICATION NO. : 13/997479
DATED : April 11, 2017
INVENTOR(S) : Koshika et al.

Page 1 of 1

It is certified that error appears in the above-identified patent and that said Letters Patent is hereby corrected as shown below:

Column 20, Line 28, "the porous conductive substance" should read --the porous carbon--

Signed and Sealed this
Eleventh Day of September, 2018

Andrei Iancu
*Director of the United States Patent and Trademark Office*